US008712994B2

(12) United States Patent
Xu et al.

(10) Patent No.: US 8,712,994 B2
(45) Date of Patent: Apr. 29, 2014

(54) TECHNIQUES FOR ACCESSING A PARALLEL DATABASE SYSTEM VIA EXTERNAL PROGRAMS USING VERTICAL AND/OR HORIZONTAL PARTITIONING

(75) Inventors: Yu Xu, Burlingame, CA (US); Olli Pekka Kostamaa, Santa Monica, CA (US)

(73) Assignee: Teradata US. Inc., Dayton, OH (US)

( * ) Notice: Subject to any disclaimer, the term of this patent is extended or adjusted under 35 U.S.C. 154(b) by 293 days.

(21) Appl. No.: 13/340,324

(22) Filed: Dec. 29, 2011

(65) Prior Publication Data
US 2013/0173594 A1 Jul. 4, 2013

(51) Int. Cl.
*G06F 17/30* (2006.01)
(52) U.S. Cl.
USPC .......................... 707/713; 707/715; 707/716
(58) Field of Classification Search
USPC ........................................ 707/713, 715, 716
See application file for complete search history.

(56) References Cited

U.S. PATENT DOCUMENTS

| 7,788,275 | B2 * | 8/2010 | Warren et al. ................. 707/763 |
| 7,801,884 | B2 * | 9/2010 | Zachariah ..................... 707/713 |
| 7,930,293 | B2 * | 4/2011 | Fox et al. ...................... 707/713 |
| 8,069,190 | B2 | 11/2011 | McColl et al. |
| 8,126,870 | B2 * | 2/2012 | Chowdhuri et al. .......... 707/713 |
| 8,166,021 | B1 * | 4/2012 | Cao et al. ..................... 707/713 |
| 8,209,664 | B2 * | 6/2012 | Yu et al. ....................... 717/119 |
| 8,239,847 | B2 * | 8/2012 | Yu et al. ........................ 717/149 |
| 8,402,033 | B1 * | 3/2013 | Mazumdar et al. ........... 707/748 |
| 8,543,690 | B1 * | 9/2013 | Zeitoun et al. ................ 709/224 |
| 2008/0005194 | A1 * | 1/2008 | Smolen et al. ................ 707/202 |
| 2010/0122065 | A1 * | 5/2010 | Dean et al. .................... 712/203 |
| 2010/0162230 | A1 * | 6/2010 | Chen et al. .................... 717/177 |
| 2010/0179855 | A1 * | 7/2010 | Chen et al. ...................... 705/10 |
| 2010/0198810 | A1 * | 8/2010 | Graefe et al. ................. 707/718 |
| 2010/0198811 | A1 * | 8/2010 | Wiener et al. ................. 707/718 |
| 2010/0281166 | A1 * | 11/2010 | Buyya et al. .................. 709/226 |
| 2011/0029477 | A1 * | 2/2011 | Tengli et al. .................... 706/54 |
| 2011/0099194 | A1 * | 4/2011 | Trevor et al. .................. 707/769 |
| 2011/0154341 | A1 * | 6/2011 | Pueyo et al. ................... 718/101 |
| 2011/0202555 | A1 * | 8/2011 | Cordover et al. ............. 707/769 |
| 2011/0213802 | A1 * | 9/2011 | Singh et al. ................... 707/774 |

(Continued)

OTHER PUBLICATIONS

"Apache Hadoop", From Wikipedia, the free encyclopedia [online]. [retrieved Dec. 21, 2011]. Retrieved from the Internet: <URL: http://en.wikipedia.org/wiki/Apache_Hadoop>, 18 pgs.

(Continued)

*Primary Examiner* — Hanh Thai
(74) *Attorney, Agent, or Firm* — Schwegman, Lundberg & Woessner P.A.

(57) ABSTRACT

Techniques for accessing a parallel database system via an external program using vertical and/or horizontal partitioning are provided. An external program to a database management system (DBMS) configures external mappers to process a specific portion of query results on specific access module processors of the DBMS that are to house query results. The query is submitted by the external program to the DBMS and the DBMS is directed to organize the query results in a vertical or horizontal manner. Each external mapper accesses its portion of the query results for processing in parallel on its designated AMP or set of AMPS to process the query results.

15 Claims, 3 Drawing Sheets

(56) References Cited

U.S. PATENT DOCUMENTS

| | | |
|---|---|---|
| 2011/0258199 A1 | 10/2011 | Oliver et al. |
| 2011/0302151 A1* | 12/2011 | Abadi et al. ............... 707/714 |
| 2011/0302226 A1* | 12/2011 | Abadi et al. ............... 707/825 |
| 2011/0302583 A1* | 12/2011 | Abadi et al. ............... 718/102 |
| 2011/0313973 A1 | 12/2011 | Srivas et al. |
| 2012/0054182 A1* | 3/2012 | Gupta et al. ............... 707/737 |
| 2012/0095987 A1* | 4/2012 | Cheng ....................... 707/713 |
| 2013/0086116 A1* | 4/2013 | Agarwal et al. ............ 707/792 |
| 2013/0103729 A1* | 4/2013 | Cooney et al. ............. 707/831 |
| 2013/0151535 A1* | 6/2013 | Dusberger et al. ......... 707/747 |
| 2013/0166601 A1* | 6/2013 | Chrapko et al. ........... 707/798 |

OTHER PUBLICATIONS

"Native BI, ETL, & Hadoop/MapReduce Integration", [online]. [retrieved Dec. 21, 2011]. Retrieved from the Internet: <URL: http://www.vertica.com/the-analytics-platforrn/native-bi-etl-and-hadoop>, 1 pg.

Dean, J., et al., "MapReduce: Simplified Data Processing on Large Clusters", USENIX Association OSDI '04: 6th Symposium on Operating Systems Design and Implementation, (2004), 137-149.

Kimball, A., "Database Access with Hadoop", [online]. [retrieved Dec. 21, 2011]. Retrieved from the Internet: <URL: http://www.cloudera.com/blog/2009/03/database-access-with-hadoop/>, (Mar. 6, 2009), 5 pgs.

* cited by examiner

TECHNIQUES FOR ACCESSING A PARALLEL DATABASE SYSTEM VIA EXTERNAL PROGRAMS USING VERTICAL AND/OR HORIZONTAL PARTITIONING

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Consumers have a plethora of choices for nearly every product and service, and enterprises can be created and up-and-running in the industry in mere days. The competition and the expectations are breathtaking from what existed just a few short years ago.

The industry infrastructure and applications have generally answered the call providing virtualized data centers that give an enterprise an ever-present data center to run and process the enterprise's data. Applications and hardware to support an enterprise can be outsourced and available to the enterprise twenty-four hours a day, seven days a week, and three hundred sixty-five days a year.

As a result, the most important asset of the enterprise has become its data. That is, information gathered about the enterprise's customers, competitors, products, services, financials, business processes, business assets, personnel, service providers, transactions, and the like.

Updating, mining, analyzing, reporting, and accessing the enterprise information can still become problematic because of the sheer volume of this information and because often the information is dispersed over a variety of different file systems, databases, and applications.

In response, the industry has recently embraced a data platform referred to as Apache Hadoop™ (Hadoop™). Hadoop™ is an Open Source software architecture that supports data-intensive distributed applications. It enables applications to work with thousands of network nodes and petabytes (1000 terabytes) of data. Hadoop™ provides interoperability between disparate file systems, fault tolerance, and High Availability (HA) for data processing. The architecture is modular and expandable with the whole database development community supporting, enhancing, and dynamically growing the platform.

However, because of Hadoop's™ success in the industry, enterprises now have or depend on a large volume of their data, which is stored external to their core in-house database management system (DBMS). This data can be in a variety of formats and types, such as: web logs; call details with customers; sensor data, Radio Frequency Identification (RFID) data; historical data maintained for government or industry compliance reasons; and the like. Enterprises have embraced Hadoop™ for data types such as the above referenced because Hadoop™ is scalable, cost efficient, and reliable.

Enterprises want a cost-effective solution to access relational data from Hadoop™ using a MapReduce™ solution, which heretofore has been elusive and spotty at best in the industry. That is, enterprise's want the ability to access theft internally-maintained DBMS's via Hadoop™ MapReduce™ implementations to improve information integration, scalability, maintenance, and support issues.

SUMMARY

In various embodiments, techniques for accessing a parallel database system via external programs using vertical and/or horizontal partitioning are presented. According to an embodiment, a method for accessing a parallel database system via external programs using vertical partitioning is provided.

Specifically, a total number of distributed mappers, which is available to externally access a parallel Distributed Database Management System (DBMS), is identified. Each mapper is configured to interact with a unique portion of query results that are to be produced on multiple access module processors of the DBMS when a query is executed on the DBMS. The query is submitted a single time over a network to the DBMS and a unique query identifier for the query is requested from the DBS. Finally, the query identifier received back from the DBMS is passed to each of the mappers, and the mappers interacting over the network with the DBMS using the query identifier to process each mapper's unique portion of the query results residing on the multiple access module processors.

DETAILED DESCRIPTION

Figure 1:
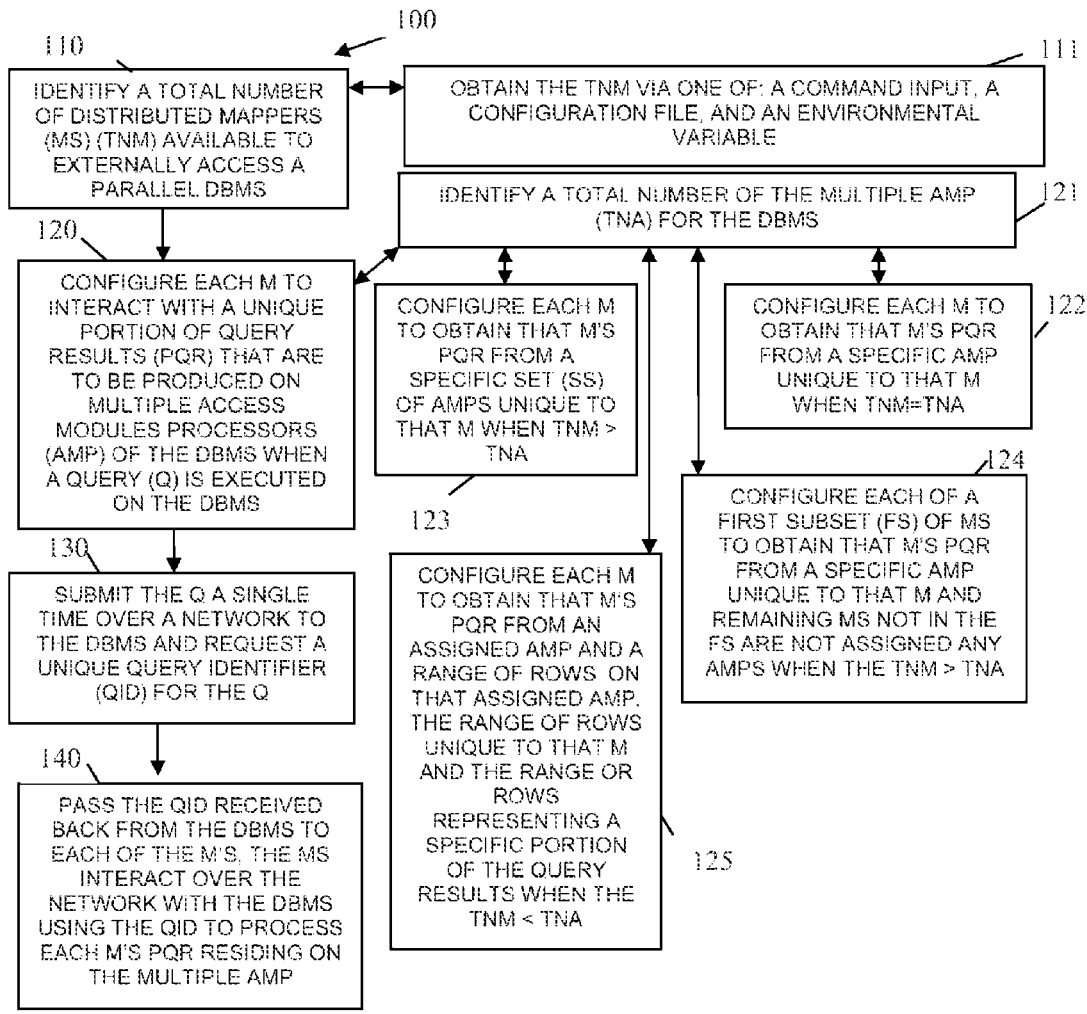
FIG. 1 is a diagram of a method for accessing a parallel database system via external programs using vertical partitioning, according to an example embodiment.

Initially for purposes of illustration and comprehension and before the FIGS. are discussed, some context and examples are presented to highlight and illustrate the techniques being presented herein and below.

Some initial context related to Hadoop™ and MapReduce™ is provided for some comprehension purposes for the details that follow.

Context

With MapReduce™ functions during the map phase the framework splits input data set into a large number of fragments and assigns each fragment to a map task. The framework also distributes the many map tasks across the cluster of nodes on which it operates. Each map task consumes key/value pairs from its assigned fragment and produces a set of intermediate key/value pairs. For each input key/value pair (K,V), the map task invokes a user defined map function that transmutes the input into a different key/value pair (K',V').

Following the map phase the framework sorts the intermediate data set by key and produces a set of (K',V'*) tuples so that all the values associated with a particular key appear together. It also partitions the set of tuples into a number of fragments equal to the number of reduce tasks.

In the reduce phase, each reduce task consumes the fragment of (K',V'*) tuples assigned to it. For each such tuple, each reduce task invokes a user-defined reduce function that transmutes the tuple into an output key/value pair (K,V). Once again, the framework distributes the many reduce tasks across the cluster of nodes and deals with shipping the appropriate fragment of intermediate data to each reduce task.

One approach for a MapReduce™ program to access relational data is to first use a DBMS's export utility to export the results of desired business queries to a local file and then load the local file to Hadoop's™ Distributed File System (HDFS) or in a stream fashion without the intermediate file. However, many times MapReduce™ programmers feel that it is more convenient and productive to directly access relational data from within their MapReduce programs without the external steps of exporting data from a DBMS and loading them to Hadoop™. Recognizing the need of integrating relational data in Hadoop™, some companies have focused on commercializing Hadoop™ related products and services; providing a few Open-Sourced JAVA classes (mainly DBInputFormat), which is in fact now part of the main Hadoop™ distribution, for purposes of allowing MapReduce™ programmers to send Structured Query Language (SQL) queries through the standard JAVA Database Connectivity (JDBC) interface to manipulate relational data. The basic idea is that a MapReduce™ programmer provides a business query in his/her program. Then, the resulting execution is transparent to the MapReduce™ programmer. The DBInputFormat class associates a modified SQL query with each Mapper. Then, each Mapper sends a query through standard JDBC drivers to the DBMS and gets back the query result and works on the results in parallel. The DBInputFormat approach is correct; since it makes sure that the union of all queries sent by all Mappers is equivalent to the original business query. While the DBInputFormat JAVA Application Programming Interface (API) and implementation provided by in the industry clearly streamlines the process of accessing relational data, the performance cannot scale.

The following example is used to explain the performance issues. Assume a customer wants to retrieve all data stored in a table called "employees" and uses 10 Mappers do some analysis on that data. The customer might send the following business query through the JDBC driver to a DBMS by using the DBInputFormat class:

select emp_id, emp_name from employees.

With the DBInputFormat approach, Hadoop™ first sends the following query to get the size of the table "select count(*) from employees" (if the user does not provide a so called "count query" in addition to the first business query to compute the size of the business query). Assume the number of rows in the result is 1005. Then, each one of the first 9 Mappers started by Hadoop™ sends the following query to process 1005/10=100 rows from the database:

select emp_id, emp_name from employees
order by emp_id
limit 100
offset offset_i*100.

Where offset_i is 0 for the first Mapper, 1 for the second Mapper . . . 8 for the $9^{th}$ Mapper.

The last Mapper sends the following SQL query to process the last 105 rows from the database:

select emp_id, emp_name from employees
order by emp_id
limit 105
offset 900

The order-by column (emp_d) is required and provided by the programmer through the DBInputFormat class, which is used to correctly partition the query's results among all Mappers, even if the MapReduce program itself does not need to sort the rows.

Essentially each Mapper sends the same business query to the database but with different LIMIT and OFFSET clauses to get and process a subset of the relational data. Clearly, this is not efficient for the DBMS to execute as many queries as the number of Mappers in the Hadoop™ system (the number of Mappers can be hundreds or more).

Discussion of Vertical and Horizontal Partitioning Techniques

The aforementioned performance issues with conventional approaches are especially serious for parallel DBMS implementations, which tend to have higher number of concurrent queries and store larger datasets. Also, the extra ordering/sorting is an expensive operation in parallel DBMS's because the rows in a table are not stored on a single node in most cases and sorting requires row redistribution. Another issue to adopt the DBInputFormat approach is that some DBMS do not support the LIMIT/OFFSET constructs since it is not included in ANSI SQL standard). A common thing between Hadoop™ and large scale data warehouses is that both run on multiple nodes, which creates opportunities for more efficient integration of Hadoop™ and these data warehouses that embodiments herein leverage.

Approaches herein utilize an approach for allowing efficient access of relational data from MapReduce™ programs to data warehouses based on vertical partitioning and/or horizontal partitioning. The vertical and horizontal approaches are discussed within the context of a business query (Q) sent by a MapReduce™ program. For ease of comprehension, only SELECT statements are considered; however it is noted the techniques discussed herein are not so limited.

Novel Vertical Partitioning Approach

The business Q is sent only once to a parallel DBMS (distributed and implemented across multiple nodes that can currently process in parallel). Notice that in a parallel DBMS, the Q result is stored on all nodes in most cases before the query result is sent to the client. It is also noted that at run time when a MapReduce™ program is started, the input format of the implementations know how many Mappers are started by Hadoop™ (the number is either provided by the programmer from command-line or from a Hadoop™ configuration file).

So, continuing with the example, let the number of Mappers be M and the number of Access Module Processors (AMPs) in the parallel DBMS be N. The technique informs each Mapper as to which AMPs to connect in order to get each Mapper's portion of the Q's result in the following manner.

1) If M==N, each Mapper is configured to connect to a unique one of AMPs. An order of assignment for AMPs to Mappers can be that the first Mapper connects to the first AMP . . . the last Mapper connects to the last AMP. Each Mapper gets every row in the Q result stored on the AMP it connects to. In the Application Programming Interface (API), when the business Q is sent to the parallel DBMS, a unique Identifier (ID) is also passed to the DBMS to be associated with the subsequent Q result. When each Mapper connects to parallel DBMS that Mapper also passes the same unique ID again to parallel DBMS to identify the result it wants to retrieve. (First case)

2) If M<N, each Mapper connects to TRUNC(N/M) number of unique AMPs except that the last Mapper connects to N−(remaining unassigned AMPS) AMPs. For example, there are 10 Mappers and 105 AMPs, each of the first 9 Mappers connect to 10 AMPs (Mapper 1 connects to the first 10 AMPs, Mapper 2 connects to the second 10 AMPs−N=105, M=10; $M_{each}$=TRUNC(105/10)=10 AMPs while the last Mapper connects to the last 15 AMPs ($M_{last}$=105−(10×9)=15). Each Mapper retrieves every row stored on the AMPs it connects to. A different assignment strategy can be deployed as well; for example, ensure no Mapper connects to more than one AMP than any other Mappers. Another approach is N/M is 10.5 so each is assigned to 10 unique AMPs, the left over 5 AMPS randomly assigned to one or more M's. The point is to sufficiently and uniquely distribute each of the AMPs to a unique M; such that a variety of approaches can be chosen. (Second Case)

3) If M>N, two choices exist. (Third Case)

A) The first choice is to only choose N Mappers to work with, which means that M-N number of Mappers do not connect to the parallel DBMS and these Mappers do not do any work. So, this case becomes the first M==N case.

B) The second choice is to allow each Mapper to retrieve only a portion of the Q result stored on an AMP. Thus, when a Mapper connects to an AMP, it not only needs to provide the unique ID used to identify the Q result associated with a certain Q like in the first M==N case, but also needs to provide a range (<start, end>) to tell the AMP that the Mapper only wants to get a portion of the rows stored on the AMP to which it connects. Notice that the AMPs do not need to sort the Q result (if the business t does not have an ORDER BY clause), unlike in the conventional implementations where an ORDER BY clause must be used to correctly partition Q result among Mappers. In this M>N case, one assignment can be that each one of the first M−(M % N) Mappers (the $i^{th}$ Mapper) asks for N/(M−(M % N)) portion of the result stored on the $\lceil M/N \rceil^{th}$ AMP, and the remaining Mappers all connect to the last AMP. All Mappers connected to the same AMP disjointed partition the Q result they retrieve from the AMP they connect to. For example, if there are 1005 Mappers (M=1005) and 10 AMPs (N=10), then the first 100 Mappers all connect to the first AMP while each Mapper asks for 1/100 of the query result stored in the first AMP . . . the Mappers numbered from 801 to 900 all connect to the $9^{th}$ AMP. The last 105 Mappers all connect to the last AMP while each retrieves 1/105 portion of the query result on the last AMP.

In any of the three cases, any type of assignment which makes sure that very row in the query result is read and only read by a Mapper is permissible; thus, other assignments can be made as well without detracting from the teachings presented herein.

This technique works when Hadoop™ needs to restart failed Mappers, since the assignment of AMPs to Mappers are stored and managed by Hadoop's metadata infrastructure. When a failed Mapper is restarted on a different Hadoop™ node, Hadoop™ still knows what AMPs (and what ranges in the query result stored on these AMPs that the restarted Mapper has to retrieve) the Mapper needs to reconnect to. This capability is provided by the Hadoop's infrastructure. So, failover considerations are accounted for by Hadoop's™ existing infrastructure with this approach.

Moreover, in the presented vertical partitioning technique, each Mapper pulls data from the AMPs in a parallel DBS system. A push-version of the presented vertical partitioning technique also works with more communication between Hadoop™ and the parallel DBMS.

Novel Horizontal Partitioning Technique

Herein, there are two available techniques for allowing efficient access of relational data from MapReduce™ programs of Hadoop™ to a parallel DBMS based on horizontal partitioning via the DBMS's Partition Primary Index (PPI) feature. The two techniques are again discussed within the context of a business Q sent by a MapReduce™ program. Again, for purposes of comprehension, just SELECT statements are considered; but it is noted that the embodiments herein are not so limited.

First Approach for the Horizontal Partitioning Technique

Essentially, a parallel DBMS connector application for Hadoop™ (referred to as DBMSInputFormat herein) sends the business Q once to parallel DBMS, Q is executed once and the result is stored in a PPI (Partitioned Primary Index) table T. Then, each Mapper from Hadoop™ sends a new query Q', which just asks for one partition (or more partitions) on each AMP. It is noted that at run time when a MapReduce™ program is started, DBMSInputFormat implementation knows how many Mappers are started by Hadoop™ (the number is either provided by the programmer from command-line or from a Hadoop™ configuration file).

Two issues are to be addressed with the first approach for the horizontal partitioning technique.

1) A decision is made as to which column(s) to build the PPI on. Notice that any business Q can be sent to the parallel DBMS. Ideally, the number of partitions is designated as the same as the number of Mappers: thus each Mapper asks only for a single partition. Another approach is to allow programmers to provide the PPI expressions through a DBMSInputFormat API, permitting programmer control over performance.

2) When creating the PPI table to store the Q results, possible column name conflicts are resolved. As an example, assume the business Q is "select * from T1, T2 where T1.a=T2.b" and that T1 and T2 have columns of the same names. An existing parallel DBMS will complain about a column name conflict if a table is created to store the above Q result.

In the horizontal partitioning technique, the DBMSInputFormat is configured to retrieve metadata from the parallel DBMS and then decide on which columns to build PPI. For example, if there is a numeric column X, the DBMSInputFormat connector may choose to build PPI based on the expression "X mod M+1" where M is the number of Mappers started by the Hadoop™ system. If there are no numeric columns, characters in some columns can be hashed and their hash values can be used as integers to build PPI. To address the second issue, the DBMSInputFormat connector is configured to retrieve metadata from the parallel DBMS and rename columns in the results if necessary. For example, column names can be prefixed with table names to remove column name conflicts. After the two issue are addressed, the DBMSInputFormat sends a new business query Z to the parallel DBMS and Z looks like the following, Create table T as (Q') with data
PRIMARY INDEX (c1)
PARTITION BY c2 MOD 100+1.

Q' is rewritten from the original business query Q after renaming to remove column name conflict (issue 2). Both c1, c2 are example columns on which to build PRIMARY INDEX (PI) and PPI (issue 1). 100 as used in Z is an example number of Mappers. After the DBMSInputFormat class sends the new business query Z to the parallel DBMS and the Z is executed, every Mapper (each Mapper is given a unique ID from 1 to N) sends the following query to retrieve a portion of the query result and works on them in parallel, Select * from T where PARTITION=n.

Where, n is the unique ID of the Mapper sending the above query. Notice that if the original business Q just selects data from a single table, which has PPI already, then another table does not have to be created. As an optimization technique, the existing PPI is used to partition the data that each Mapper should receive. After all Mappers retrieve the data, the table T can be deleted.

Second Approach for the Horizontal Partitioning Technique

The second approach is similar to the first approach in that the concept of PPI is used. However, the second approach requires minimal work on the DBMSInputFormat connector side but uses new features implemented by the parallel DBMS server. In this second approach, the DBMSInputFormat class sends the following business Q to the parallel DBMS, which uses syntax currently not supported by existing DBMS.

Create PPI (100 Partitions) table T as (Q) with data

The parallel DBMS is expected to automatically address the two issues mentioned in the first approach: removing column name conflicts and creating the correct PI and PPI. With the sample number 100 (which is the number of Mappers that communicate with the parallel DBMS in the ongoing example), that parallel DBMS is asked to build 100 partitions. Currently, a PPI can only be built on a table with PI. So, one additional optimization here is to allow a PPI on a No Primary Index (NoPI) table. Thus, partitions are directly built in parallel on every AMP without moving the Q results of the business Q across AMPs. A further optimization is to not sort the rows on any AMP to build the 100 partitions. The first 1/100 portion of the query result on any AMP can be assigned the partition number 1 . . . the last 1/100 portion of the Q result on any AMP can be assigned the partition number 100.

Similar to the first solution, after the DBMSInputFormat class sends the new business query to the DBMS and the query is executed, every Mapper sends the following query to retrieve a portion of the query result and works on them in parallel, Select * from T where PARTITION=n.

Figure 2:
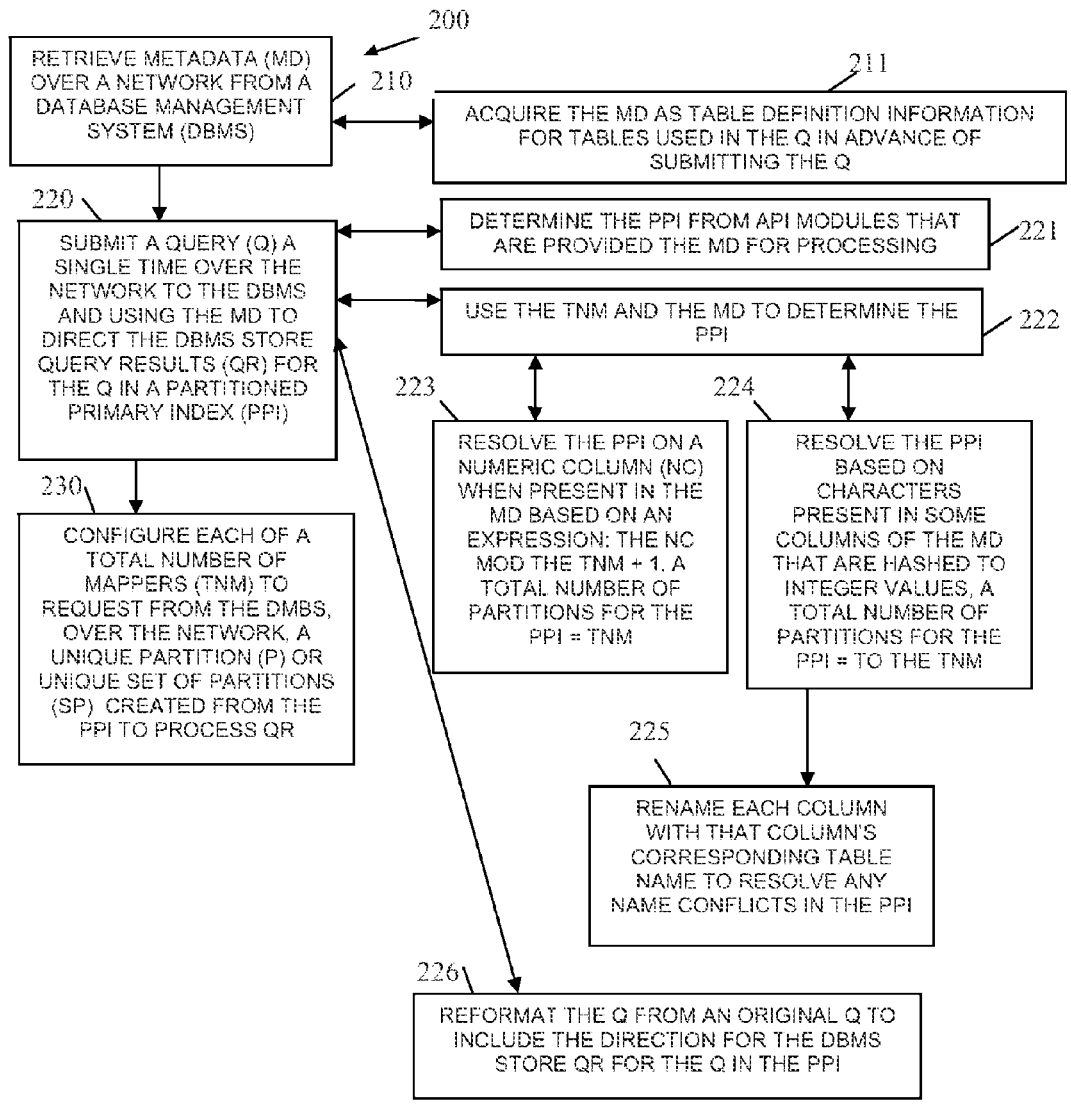
FIG. 2 is a diagram of a method for accessing a parallel database system via external programs using horizontal partitioning, according to an example embodiment.
Figure 3:
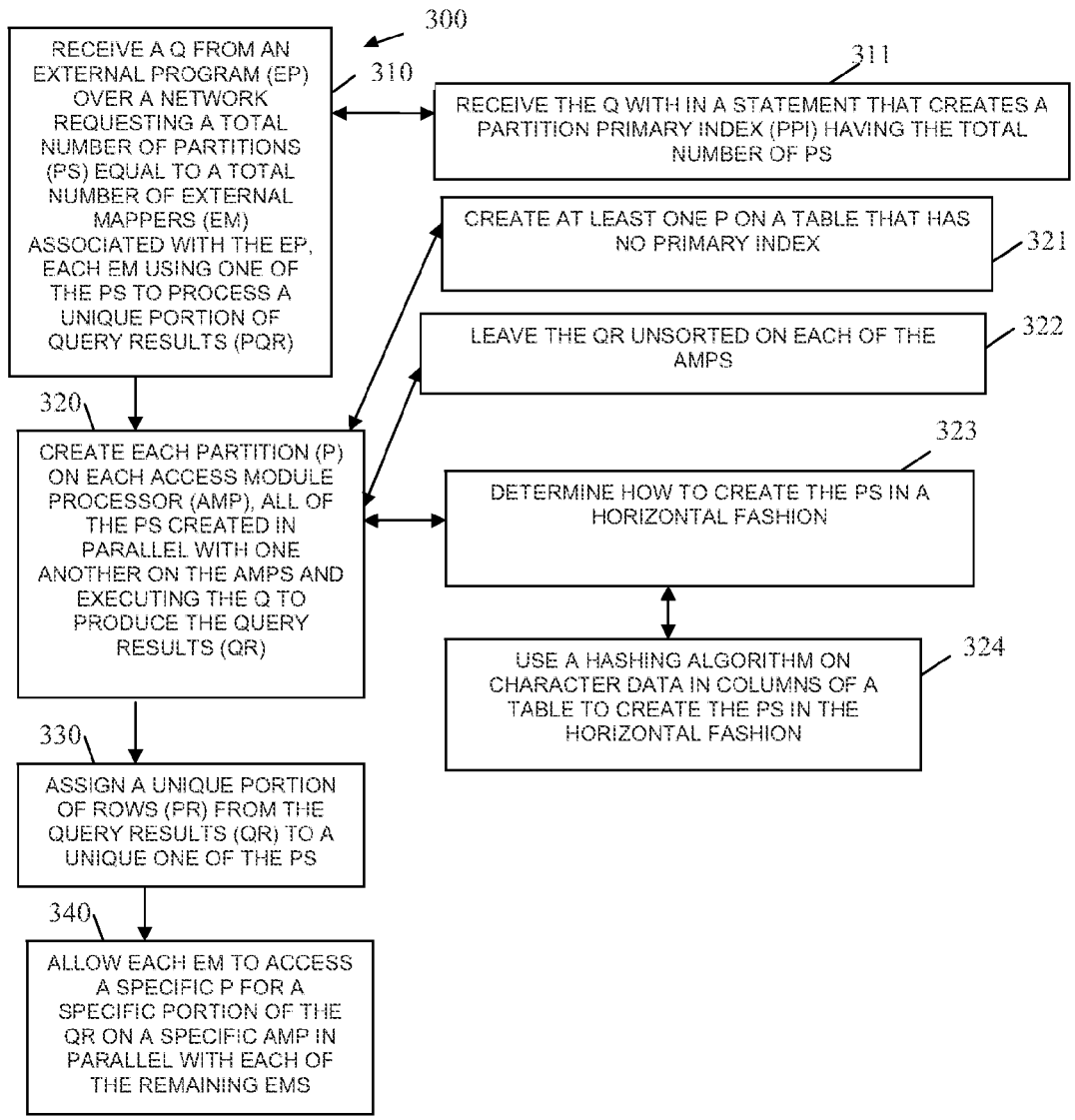
FIG. 3 is a diagram of another method for accessing a parallel database system via external programs using horizontal partitioning, according to an example embodiment.

With the above detail of the vertical and horizontal partitioning techniques presented, various embodiments are now presented with the discussion of the FIGS. 1-3.

FIG. 1 is a diagram of a method 100 for accessing a parallel database system via external programs using vertical partitioning, according to an example embodiment. The method 100 (hereinafter "vertical integrator") is implemented as instructions within a non-transitory computer-readable storage medium that execute on one or more processors, the processors specifically configured to execute the vertical integrator. Moreover, the vertical integrator is programmed within a non-transitory computer-readable storage medium. The vertical integrator is also operational over a network; the network is wired, wireless, or a combination of wired and wireless.

The vertical integrator presents another and in some ways an enhanced processing perspective to that which was discussed and shown above with respect to the vertical integration technique.

At 110, the vertical integrator identifies a total number of mappers available to externally access a parallel DBMS. In an embodiment, the vertical integrator is implemented in a Hadoop™ platform as the DBMSInputFormat described above and each mapper is provided as a MapReduce™ programs/functions as described above. Other implementations may be used where the vertical integrator and the mappers are modules that support parallel processing of query results that exists outside a native DBMS implementation. That is, the operations and processing of the vertical integrator and the mappers are external and not supported or part of the DBMS being accessed remotely over a network connection, such as a wide-area network (WAN) (e.g., Internet, and others).

According to an embodiment, at 111, the vertical integrator obtains the total number of mappers via one or more of: a command line processing parameter/input value, a configuration file for when the vertical integrator is initiated, and/or an environmental variable set within the processing environment of the vertical integrator.

At 120, the vertical integrator configures each mapper to interact with a unique portion of query results that at this point in processing has not yet been produced but all to be produced on multiple access module processors (AMPs) of the DBMS when a query (that produces the query results) is eventually (discussed below) executed on the DBMS. Essentially, no mapper processes a same portion of the query results.

According to an embodiment, at 121, the vertical integrator identifies a total number of the multiple AMPs for the DBMS. This too can be achieved via configuration or command-driven manners as discussed above at 111. In some situations, the vertical integrator uses an API command to query the DBMS to identify the total number of multiple AMPs. Once the total number of mappers and the total number of AMPs are known to the vertical integrator, assignment to each mapper a unique portion of the as yet unavailable query results can occur under a variety of conditions that exist.

For example, at 122, when the total number of mappers is equal to the total number of AMPs, the vertical integrator configures each mapper with a specific AMP that is unique to that mapper to the exclusion of the remaining mappers. So, there is a one-to-one relationship between each mapper and each AMP.

Under another condition where the total number of mappers is greater than the total, at 123, the vertical integrator configures each mapper to obtain that mapper's unique portion of the as-yet unresolved query results from a specific set of AMPs unique to that mapper. This scenario was discussed above and exists such that at least one of the total number of mappers works with more than one of the AMPs. It is similar to the processing of 122 in that no two mappers work with a same one of the AMPs.

Another situation can exists when the total number of mappers is greater than the total number of AMPs. For example, at 124, the vertical integrator configures each of a first subset of mappers to obtain that mapper's unique portion of the as-yet unresolved query results from a specific AMP. The each of the remaining mappers not part of the first subset are not assigned to any AMP at all. So, again no two mappers work with the same one of the AMPs (similar to 122 and 123) but in this situation there is one or more mappers that do no work at all and are essentially unused.

In a final condition, at 125, exists when that total number of mappers is less than the total number of AMPs. This means that at least one of the mappers has to work with a same AMP when the query results are ultimately processed by the mappers. Here, the vertical integrator configures each mapper to obtain that mapper's portion of the as-yet unresolved query results from an assigned AMP and a range or rows (for the as-yet unresolved query results) on that assigned AMP. The range of rows assignment is unique to each mapper and represents a specific portion of the as-yet unresolved query results. So, each range of rows in the total range for the rows has a one-to-one relationship with each mapper. But, each mapper or at least one mapper has a one-to-many relationship with the AMPs.

At 130, the vertical integrator submits the query a single time over a network to the DBMS and simultaneously requests a unique query identifier for the submitted query. This is different from existing Hadoop™ approaches where the query is actually submitted by each mapper, which in the conventional approach means; the DBMS may process a same query hundreds or even thousands of times and is extremely inefficient. Here, the vertical integrator submits the query once only.

At 140, the vertical integrator passes the query identifier, which the DBMS returned to the vertical integrator, to each of the mappers. Each mapper then interacts with its unique portion of the query results (produced by the DBMS) using the query identifier (to uniquely identify the query results to the exclusion of other queries the DBMS may be handling).

Each mapper either interacts with a unique AMP or a unique range of rows for the query results on any given AMP (as described above with respect to the processing at 125) (it is also noted under some conditions, such as that which was explained at 124, some mappers may not be involved in processing the query results at all).

The processing of the FIG. 1 describes techniques for accessing a parallel DBMS via external programs (the vertical integrator and the mappers and external to the DBS) using vertical partitioning of the query results. FIGS. 2 and 3 now discuss different approaches for these external programs to access and process query results of a DBMS using two approaches to horizontal partitioning.

FIG. 2 is a diagram of a method 200 for accessing a parallel database system via external programs using horizontal partitioning, according to an example embodiment. The method 200 (hereinafter "horizontal integrator") is implemented as instructions within a non-transitory computer-readable storage medium that execute on one or more processors, the processors specifically configured to execute the horizontal integrator. Moreover, the horizontal integrator is programmed within a non-transitory computer-readable storage medium. The horizontal integrator is also operational over a network; the network is wired, wireless, or a combination of wired and wireless.

The horizontal integrator presents the processing that was discussed and shown above with respect to the first approach of the horizontal integration technique.

Similar to the discussion of the FIG. 1, the horizontal integrator is, in an embodiment, implemented as a custom Hadoop™ program that utilizes a plurality of MapReduce™ programs/function to externally access AMPs of a DBMS and submit and process query results for a query processed by the DBMS and housed on the AMPs. Different from the FIG. 1, the horizontal integrator processes the query results using horizontal partitioning of the results whereas the FIG. 1 used vertical partitioning.

At 210, the horizontal integrator retrieves metadata over a network from a DBMS.

According to an embodiment, at 211, the horizontal integrator acquires the metadata as table definition information for tables used in the query in advance of actually submitting the query. This metadata provides column types and information for tables used in the query.

At 220, the horizontal integrator submits the query a single time over the network to the DBMS using the metadata to direct the DBMS to store the query results for the query in a custom defined partitioned primary index (PPI).

In an embodiment, at 221, the horizontal integrator determines the PPI from API modules provided the metadata as input for processing. In this way, resolution of the PPI can be custom developed by developers in custom API modules that interact with the horizontal integrator, such that the horizontal integrator provides the metadata and the total number of mappers as input to the modules and the modules return SQL statements to include with the query that direct the DBMS to create a specific PPI for the query results of the query on the AMPs of the DBMS.

In an embodiment, at 222, the horizontal integrator uses the total number of mappers and the metadata to determine the PPI. Determination of the total number of mappers was discussed in detail above with reference to the FIG. 1 and can be used similarly here with the discussion of the horizontal integrator.

A variety of alternatives for resolving the PPI definition that is provided with the query to the DBMS can be used.

For example, at 223, the horizontal integrator resolves the PPI based on a numeric column present in the metadata using an expression, such as: the numeric column MOD the total number of mappers+1. The total number of mappers is equal to the total number of resulting partitions in the PPI definition resolved.

Alternatively, at 224, and if there are no numeric columns or if desired and even when numeric columns exist, the horizontal integrator resolves the PPI based on characters present in some columns of the metadata that are then hashed into integer values. Again, the total number of resulting partitions in the PPI definition is equal to the total number of mappers.

Continuing with the embodiment of 224 and at 225, the horizontal integrator reformats the query from an original query to include the direction for the DBMS to store the query results for the query in the PPI. In other words, the single submitted query includes the PPI statements when singularly submitted to the DBMS. There need not be multiple interactions with the DBMS from the horizontal integrator to submit the query and to direct the DBMS to create the partitions for the PPI.

At 230, the horizontal integrator configures each of the total number of mappers to request from the DBMS, over the network, a unique partition or unique set of partitions created from the PPI. So, each mapper processes a unique partition of the query results or a unique set of partitions. No mapper processes a same partition as another one of the mappers.

FIG. 3 is a diagram of another method 300 for accessing a parallel database system via external programs using horizontal partitioning, according to an example embodiment. The method 300 (hereinafter "horizontal partition manager") is implemented as instructions within a non-transitory computer-readable storage medium that execute on one or more processors, the processors specifically configured to execute the vertical integrator. Moreover, the horizontal partition manager is programmed within a non-transitory computer-readable storage medium. The horizontal partition manager is also operational over a network; the network is wired, wireless, or a combination of wired and wireless.

The horizontal partition manager presents an alternative approach to that which was discussed above with reference to the FIG. 2; moreover, processing associated with the horizontal partition manager was discussed above with reference to the second approach of the horizontal integration technique.

It is noted that for the processing of the horizontal partition manager an existing DBMS that is used is enhanced to permit that DBMS to create a PPI on a No Primary Index (NoPI) table within the DBMS. This enhancement processing is described as the horizontal partition manager. In other words, the processing of the FIGS. 1 and 2 were presented from the prospective a an external program to the DBMS; but the horizontal partition manager is presented from the prospective of enhanced features that operate within the DBMS that interface over the network with external programs, such as ones developed and implemented in Hadoop™ using MapReduce™ programs/modules.

At 301, the horizontal partition manager receives a query from an external program over a network requesting a total number of partitions equal to a total number of partitions equal to a total number of external mappers associated with the external program. Each external mapper using one of the partitions to process a unique portion of the query results. The external mappers were discussed above as the mappers, and the external program was discussed above in the context of the FIGS. 1 and 2; however unlike the FIG. 2 the external program does not resolve how to create the partitions; rather that is left up to the horizontal partition manager, which is an enhancement to a DBMS. The job of the external programmer in the embodiment of FIG. 3 is to request a total number of partitions with a query from the horizontal partition manager and then configure each of the external mappers to subsequently process the resulting query results on its pre-designated access module processor of the DBMS.

According to an embodiment, at 311, the horizontal partition manager receive the query with a statement that creates a partition primary index that has the total number of partitions.

At 320, the horizontal partition manager creates each partition on each access module processor. All of the partitions are created in parallel with one another on the access module processors and the query is executed to produce the query results.

In an embodiment, at 321, the horizontal partition manager creates at least one partition on a table that has no primary index (an enhancement over existing DBMS implementations).

According to an embodiment, at 322, the horizontal partition manager leaves the query results unsorted on each of the AMPS.

In one scenario, at 323, the horizontal partition manager determines how to create the partitions in a horizontal fashion.

Continuing with the embodiment of 323 and at 324, the horizontal partition manager uses a hashing algorithm on character data in columns of a table to create the partitions in the horizontal fashion.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by one or more processors, the processors configured to execute the method, comprising:
identifying a total number of distributed mappers available to externally access a parallel Distributed Database Management System (DBMS) and identifying a total number of the multiple access module processors for the DBMS and configuring each of a first subset of mappers to obtain that mapper's unique portion of the query results from a specific access module processor unique to that mapper, and remaining mappers not in the first subset are not assigned any access module processors when the total number of mappers is greater than the total number of access module processors;
configuring each mapper to interact with a unique portion of query results that are to be produced on multiple access module processors of the DBMS when a query is executed on the DBMS;
submitting the query a single time over a network to the DBMS and requesting a unique query identifier for the query; and
passing the query identifier received back from the DBMS to each of the mappers, the mappers interacting over the network with the DBMS using the query identifier to process each mapper's unique portion of the query results residing on the multiple access module processors.

2. The method of claim 1, wherein identifying further includes obtaining the total number of mappers via one of: a command input, a configuration file, and an environmental variable.

3. A method implemented and programmed within a non-transitory computer-readable storage medium and processed by one or more processors, the processors configured to execute the method, comprising:
retrieving metadata over a network from a database management system (DBMS);
submitting a query a single time over the network to the DBMS and using the metadata to direct the DBMS store query results for the query in a partitioned primary index; and
configuring each of a total number of mappers to request from the DBMS, over the network, a unique partition or unique set of partitions created from the partitioned primary index to process query results and identifying a total number of multiple access module processors for the DBMS and configuring each of a first subset of the mappers to obtain that mapper's unique portion of the query results from a specific access module processor unique to that mapper, and remaining mappers not in the first subset are not assigned any access module processors when the total number of mappers is greater than the total number of access module processors.

4. The method of claim 3, wherein retrieving further includes acquiring the metadata as table definition information for tables used in the query in advance of submitting the query.

5. The method of claim 3, wherein submitting further includes determining the partitioned primary index from application programming interface modules that are provided the metadata.

6. The method of claim 3, wherein submitting further includes using the total number of mappers and the metadata to determine the partitioned primary index.

7. The method of claim 6, wherein using the total number of mappers further includes resolving the partitioned primary index on a numeric column when present in the metadata based on an expression: the numeric column MOD the total number of mappers plus 1, a total number of partitions for the partitioned primary index equal to the total number of mappers.

8. The method of claim 7, wherein using the total number of mappers further includes resolving the partitioned primary index based on characters present in some columns of the metadata that are hashed to integer values, a total number of partitions for the partitioned primary index equal to the total number of mappers.

9. The method of claim 8 further comprising, renaming each column with that column's corresponding table name to resolve any name conflicts in the partitioned primary index.

10. The method of claim 3, wherein submitting further includes reformatting the query from an original query to include the direction for the DBMS store query results for the query in the partitioned primary index.

11. A method implemented and programmed within a non-transitory computer-readable storage medium and processed by one or more processors, the processors configured to execute the method, comprising:
receiving a query from an external program over a network requesting a total number of partitions equal to a total number of external mappers associated with the external program, each external mapper using one of the partitions to process a unique portion of query results;
creating each partition on each access module processor, all of the partitions created in parallel with one another on the access module processors and executing the query to produce the query results;

assigning a unique portion of rows from the query results to a unique one of the partitions; and allowing each external mapper to access a specific partition for a specific portion of the query results on a specific access module processor in parallel with each of the remaining external mappers and identifying a total number of the access module processors for a Database Management System (DBMS) and configuring each of a first subset of the external mappers to obtain that external mapper's unique portion of the query results from a specific access module processor unique to that external mapper and remaining external mappers not in the first subset are not assigned any access module processors when the total number of external mappers is greater than the total number of access module processors.

12. The method of claim 11, wherein receiving further includes receiving the query with in a statement that creates a partition primary index having the total number of partitions.

13. The method of claim 11, wherein creating further includes leaving the query results unsorted on each of the access module processors.

14. The method of claim 11, wherein creating further includes determining how to create the partitions in a horizontal fashion.

15. The method of claim 11, wherein creating further includes using a hashing algorithm on character data in columns of a table to create the partitions in the horizontal fashion.

* * * * *